United States Patent [19]

Breitfuss

[11] 4,087,219
[45] May 2, 1978

[54] APPARATUS FOR INSTALLING UNDERGROUND PIPELINES

[76] Inventor: Thomas K. Breitfuss, 17541 Orange Tree La., Tustin, Calif. 92680

[21] Appl. No.: 752,143

[22] Filed: Dec. 20, 1976

[51] Int. Cl.² .............................................. E02D 15/04
[52] U.S. Cl. ..................................... 425/59; 61/72.2; 425/110; 425/147
[58] Field of Search ............................. 425/59, 63-65, 425/113, 126, 147, 110; 264/33-35; 61/72.2

[56] References Cited
U.S. PATENT DOCUMENTS

| 1,778,099 | 10/1930 | Webb | 425/64 |
| 3,032,852 | 5/1962 | Hanson | 425/59 |
| 3,089,213 | 5/1963 | Williamson | 61/72.2 |
| 3,534,449 | 10/1970 | Blixt et al. | 425/64 |
| 3,662,437 | 5/1972 | Long, Sr. | 425/147 |
| 3,830,606 | 8/1974 | Breitfuss | 425/64 |

FOREIGN PATENT DOCUMENTS 650,230  10/1962  Canada ................................ 425/59

Primary Examiner—Francis S. Husar
Assistant Examiner—John McQuade
Attorney, Agent, or Firm—Gordon L. Peterson

[57] ABSTRACT

An apparatus for forming underground pipelines of the type which includes a plurality of component sections at least partially enclosed by a formable outer component, such apparatus comprising a receptacle, including a bulkhead at one end of the receptacle. The receptacle has an inlet opening sized to receive the inner component sections and the bulkhead has an outlet opening of sufficient size to permit an inner component section to pass rearwardly from the receptacle through the outlet opening. The apparatus and the inner component section are relatively axially advanceable so that the inner component section can be moved rearwardly relative to the apparatus and through the outlet opening. The formable outer component is delivered from a source of the outer component to a location rearwardly of the bulkhead. The bulkhead inhibits the flow of formable outer component forwardly through the outlet opening. The source of the formable outer component may be remote from the apparatus.

19 Claims, 8 Drawing Figures

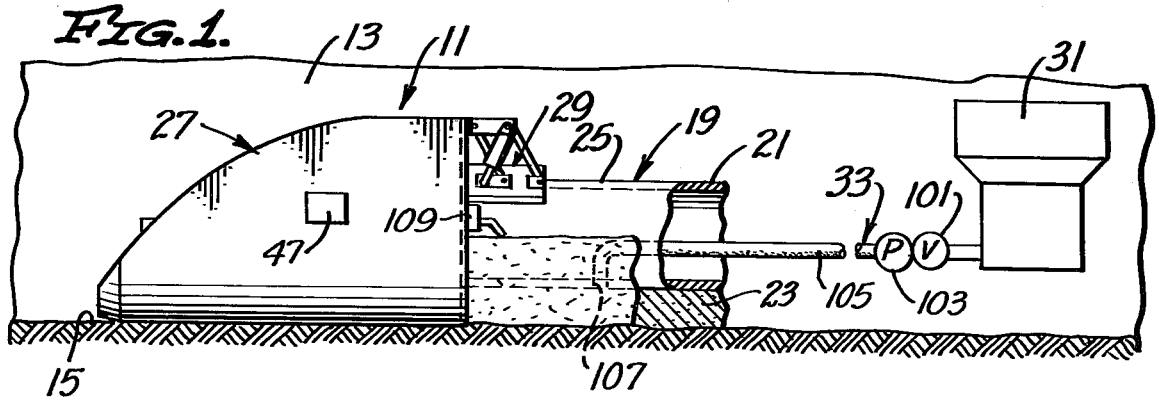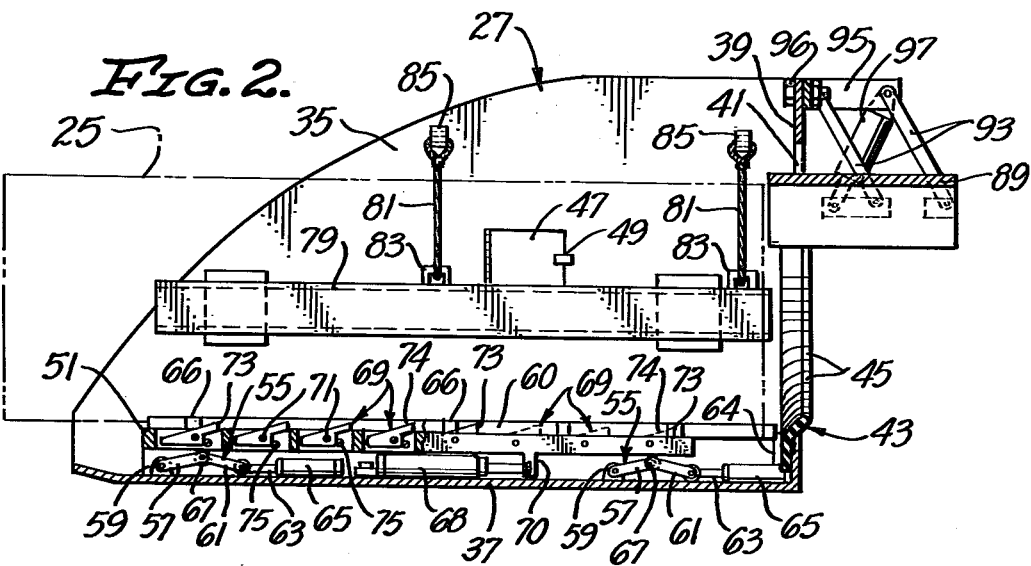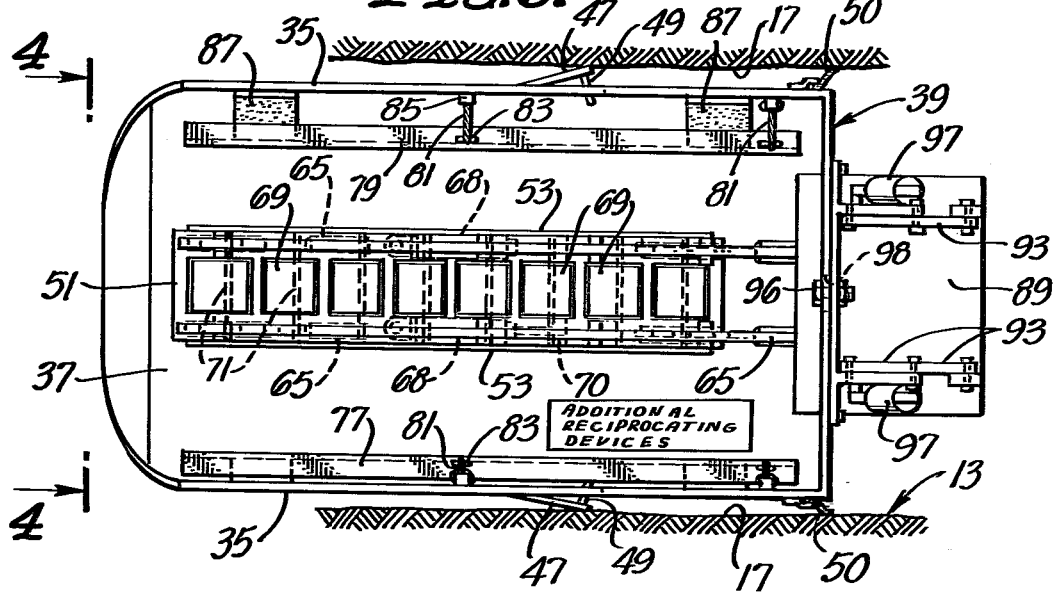

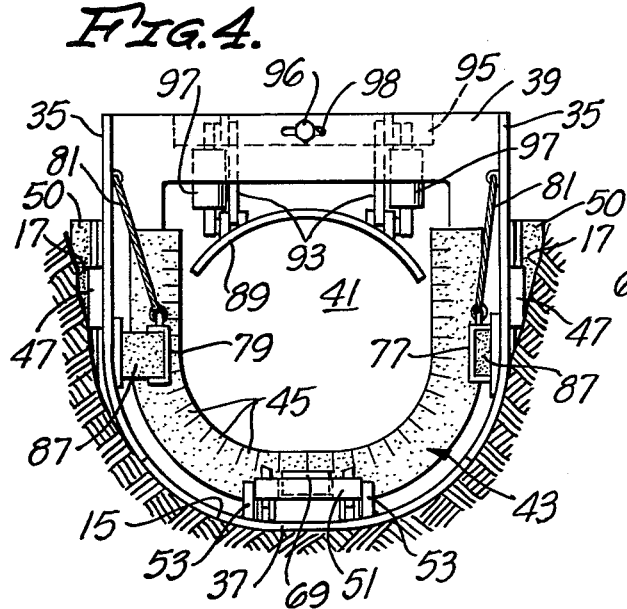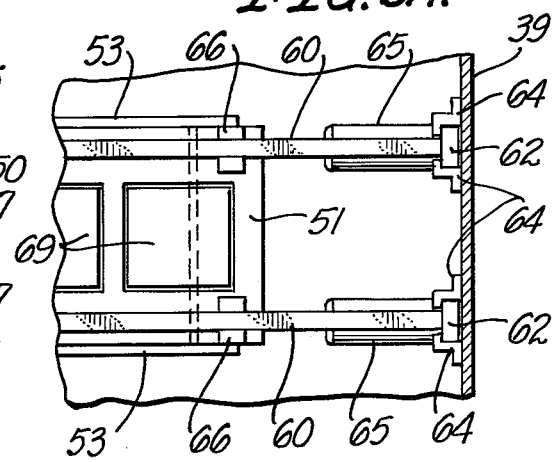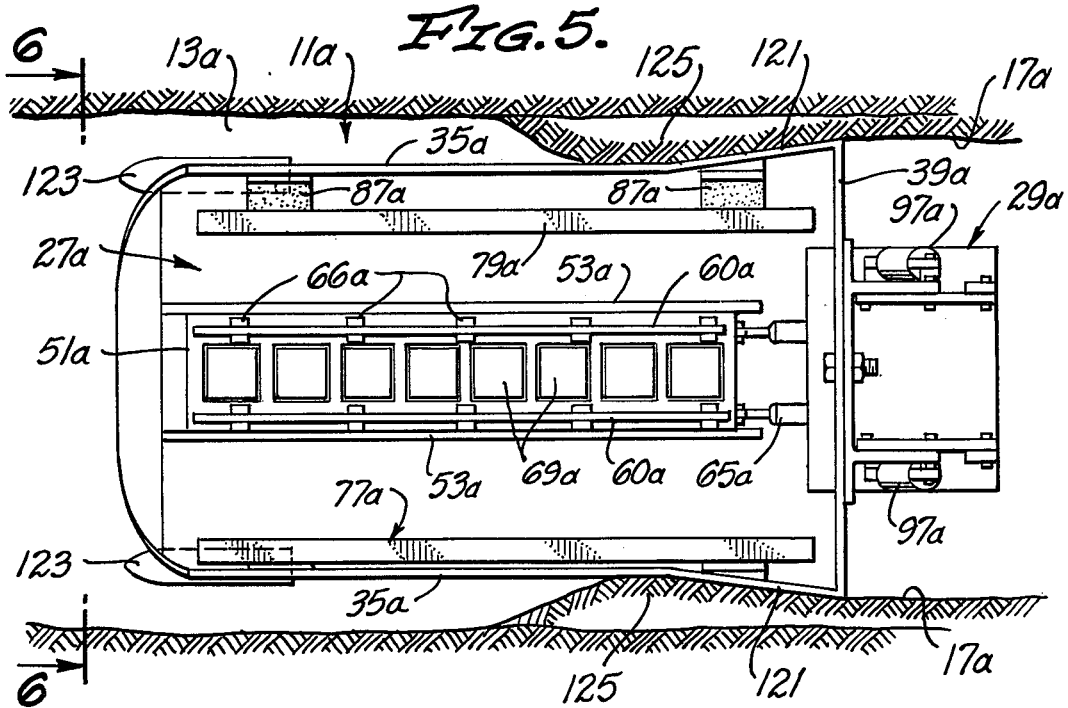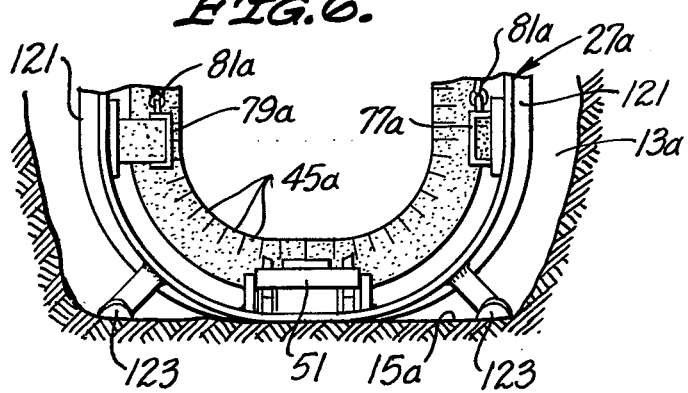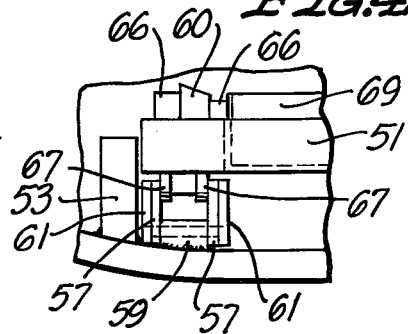

APPARATUS FOR INSTALLING UNDERGROUND PIPELINES

BACKGROUND OF THE INVENTION

This invention relates to an apparatus for forming underground pipelines of the type which include, at least during construction of the pipeline, an inner component at least partially enclosed by a formable outer component. The inner component typically includes a plurality of inner component sections joined in end-to-end relationship. Each of the inner component sections may be, for example, a pipe section, a core unit, or an inner form. If a pipe section or core section is used, such section remains as a permanent part of the pipeline. However, if a form is used, it is removed after the outer component is applied, and in this event, the form is part of the pipeline only during construction of the pipeline.

The formable outer component may be of a variety of flowable materials used to encase, or partially encase, the inner component. For example, the formable outer component may be a cementitious material, such as concrete or other materials, which is flowable and curable to form a casing, or partial casing, for the inner component. Alternatively, the formable outer component may be a cushion material or a noncurable material such as sand or soil. The resulting pipeline can be made capable of carrying various materials, including liquids.

My prior U.S. Pat. No. 3,830,606 discloses an apparatus for forming underground pipelines of the type described above. The patented construction includes a recetptacle for receiving an inner component section and a bulkhead at one end of the receptacle. The bulkhead has an outlet opening so that the inner component section can be passed through the outlet opening and be joined to a previously laid inner component section. A hopper for storing a supply of the formable outer component is mounted on the bulkhead. Thus, the formable outer component in the hopper forms a source of the outer component. In the preferred embodiment of U.S. Pat. No. 3,830,606, the formable outer component is flowed downwardly from the hopper to a region rearwardly of the bulkhead so it can enclose the inner component. Another function of the hopper is to provide a hold-down mechanism for the inner component so that it will not be elevated above a predetermined position in response to various forces acting on the inner component section, such as the flotation force exerted on it by the formable outer component.

The patented method and apparatus are very satisfactory. However, the emptying and filling of the hopper cause the apparatus to have a substantially variable mass which, in certain applications, could move or gouge the inner component section or create adverse grade control as the apparatus advances. In addition, the formable outer component is dispensed by the hopper from above the inner component section, and this can cause air to be trapped beneath the inner component with the result that the casing around the inner component contains voids.

SUMMARY OF THE INVENTION

The present invention solves the problems noted above. Thus, the present invention is an improvement on the apparatus described in my U.S. Pat. No. 3,830,606.

With this invention, the receptacle has a substantially constant mass, and it does not tend to move or gouge the inner component or to create grade control problems. This can be accomplished for example, if the receptacle is not used to carry the source of formable outer component. With this invention, the source of formable outer component can be located at virtually any reasonable location in operative association with the receptacle other than on the receptacle, including locations remote from the receptacle. For example, the source may be located on the ground or on a special stand or support. As the source need not be on the receptacle, a much wider selection of locations is available.

The formable outer component can be delivered from the source to a location rearwardly of the bulkhead by various means operatively associated with the source or the receptacle, such as a pump, a chute, a belt, etc. For example, the formable outer component can be pumped through a conduit to the underside of the inner component, and this eliminates the entrapment of air beneath the inner component. For example, the formable outer component may be pumped through openings in the inner component or around the inner component.

The new invention contains various other features which can be used singly or in combination with the above-described features. For example, with the new invention, the receptacle can contain one or more inner component sections of greater total length than the receptacle. This can be advantageously accomplished by providing an inlet opening in the receptacle with the inlet opening including an opening formed in the forward end. This allows an inner component section to protrude forwardly of the receptacle. The shorter receptacle of this invention is less expensive and can travel around or over a sharper curve while providing for more rapid loading of the machine.

For some applications, it is desirable to provide means for at least partially relatively advancing the receptacle and the inner component section in the receptacle. Although this function can be carried out in various different ways, if the forward end of the receptacle is open to accommodate long inner component sections, it is not possible to locate the advancing means forwardly of the receptacle as was done in my prior patented construction. Accordingly, the new invention employs means on the receptacle engageable with the inner component section when the latter is in the receptacle for relatively advancing the receptacle and such inner component section. Such means can advantageously be located at the bottom of the receptacle beneath the inner component section so that such means will not interfere with loading of the inner component section into the receptacle.

The receptacle not only receives the inner component section, but also includes supporting means for supporting the inner component section. Optional, but desirable, features of the invention are adjustable positioning means in the receptacle. Adjustable positioning means may be capable of moving the inner component sections in the receptacle while other means may be provided to move the receptacle itself in various transverse directions, including up and down and laterally. The adjustable positioning means to move the inner component sections can advantageously include means which is inflatable to apply at least one of the positioning forces to a portion of the inner component section. In addition to, or in lieu of, the adjustable positioning means, extendable means may be provided for moving the receptacle itself up, down and/or laterally by reacting against the trench walls to further position the inner component section.

Means is associated with the bulkhead for inhibiting the flow of the formable outer component forwardly through the outlet opening of the bulkhead. Such means may include, for example, appropriately sizing and configuring the outlet opening relative to the inner component section to be passed therethrough so as to substantially preclude the formable outer component from flowing forwardly through the outlet opening. However, in a preferred form, such means includes means defining the periphery of the outlet opening with at least a portion of the periphery being resilient. This enables an inner component section having a varying periphery to be passed through the outlet opening without materially increasing the likelihood of the flow of the formable outer component through the outlet opening. In a preferred construction, the resilient means includes a resilient diaphragm having a plurality of adjacent, resilient fingers which define said portion of the outlet opening. These fingers are individually movable to accommodate local irregularities in the periphery of the inner pipe section, such as may be produced when the inner component section includes reinforcing members on its outer periphery.

For some applications, it is necessary or desirable to provide hold-down means coupled to the receptacle for restraining the inner component section against transverse movement in at least one direction beyond a predetermined position. Unlike my patented construction, the hold-down means of this invention can be of substantially constant mass, and there is no need to pass the formable outer component through the hold-down means. Thus, the hold-down means may be independent of the means for delivering the formable outer component Another feature of this invention is that the apparatus may be constructed so that the flow of formable outer components forwardly through the outlet opening in the bulkhead is inhibited only at locations where such forward flow is likely to occur. More particularly, if the formable outer component is to encase only the lower regions of the inner component, then the diaphragm can be arranged so as to engage only the lower regions of the inner component section being passed therethrough. In this event, the upper regions of the outlet opening and the diaphragm are spaced from such inner component section. This reduces the wear on the diaphragm and the drag which would exist if the diaphragm engaged the inner component section for a full 360° around its periphery. In addition, inner component sections of varying vertical dimensions can be accommodated in the same apparatus.

This latter feature of the invention can advantageously be combined with sensing means which is responsive to the elevation of the formable outer component for substantially preventing the elevation of the formable outer component rising to the upper regions of the outlet opening. In other words, the sensing means prevents the outer component level from rising to an elevation in which it could flow through the unsealed regions between the inner component section and the diaphragm.

For pipelines installed in a trench, it has been found that the strength of the soil structure system depends to a large degree on the density of the material in the trench wall. Thus, an improved soil structure system can be provided by relatively dense trench side walls.

The present invention provides means responsive to the relative advance of the apparatus and the inner component section for compacting compactible side walls of the trench in which the pipeline is being formed. Such means can include, for example, first and second generally opposed side walls of the receptacle with at least portions of such side walls tapering away from each other as they extend rearwardly. Accordingly, when the apparatus is advanced in the trench, the side walls progressively wedge or compact the compactible materials of the side walls of the trench. The side walls also serve to prevent soil along the side walls of the trench from sloughing into the trench.

The invention, together with further features and advantages thereof, may best be understood by reference to the following description taken in connection with the accompanying illustrative drawings.

BRIEF DESCRIPTION OF THE DRAWINGS

FIG. 1 is a partially schematic, fragmentary, side elevational view of an apparatus constructed in accordance with the teachings of this invention with the apparatus being shown in a trench.

FIG. 2 is a longitudinal sectional view of the apparatus with an inner component section being shown in phantom lines in the receptacle.

FIG. 3 is a top plan view of the apparatus.

FIG. 3A is a fragmentary view of a central region of the bottom of the receptacle with the rails for supporting the inner component section being shown.

FIG. 4 is an end elevational view taken generally along line 4—4 of FIG. 3.

FIG. 4A is an enlarged fragmentary view of one corner region of the mounting plate and associated structure at the bottom of the receptacle.

FIG. 5 is a top plan view similar to FIG. 3 of a second embodiment of the invention with the rails broken away.

FIG. 6 is a fragmentary end elevational view taken generally along line 6—6 of FIG. 5.

DESCRIPTION OF THE PREFERRED EMBODIMENT

FIG. 1 shows an apparatus 11 positioned in a trench 13 having a bottom 15 and opposite sides 17 (FIG. 4). In the embodiment illustrated, the bottom 15 of the trench 13 is below natural ground level; however, the trench 13 is merely illustrative of the environments in which the apparatus 11 may be used.

The apparatus 11 is useful in forming an underground pipeline 19 of the type which includes an inner component 21 and a formable outer component 23. As explained hereinabove, the inner component 21 and the outer component 23 may be of various different kinds. In the embodiment illustrated, the inner component 21 includes a plurality of rigid, substantially cylindrical pipe sections 25 joined in end-to-end relationship, and the outer component 23 is concrete. Although the outer component 23 may completely encase the inner component 21, in the embodiment illustrated, the outer component forms, in effect, a saddle which embraces approximately the lower one half of the periphery of the inner component.

The apparatus 11 generally includes a receptacle 27, a hold-down mechanism 29, a source 31 of the outer component, and delivery means 33 for delivering the outer component from the source 31 to a location rearwardly of the receptacle 27. With reference to FIGS. 2-4, the receptacle 27 includes generally opposed side walls 35 integrally jointed by a bottom wall 37. Although various configurations are possible, in the embodiment illustrated, the bottom wall 37 is arcuate in radial cross section (FIG. 4) and at least the upper portions of the side walls 35 are vertical and parallel.

The receptacle 27 also includes a bulkhead 39 extending generally transversely of the receptacle adjacent the rearward end thereof. In the embodiment illustrated, the bulkhead 39 forms a rear end wall for the receptacle 27, and it is coupled to the side walls 35. The receptacle 27 is preferably constructed of a strong material such as a suitable metal, and it is a relatively strong, rigid structure.

In the embodiment illustrated, the top and forward end of the receptacle 27 are open to define an inlet opening so that the receptacle can receive at least one of the inner component pipe sections 25 from above or from the front. Because the forward end of the receptacle is open, the length of the individual pipe section 25 or of two or more pipe sections so received can exceed the length of the receptacle 27.

The bulkhead 39 has a large outlet opening 41. Preferably, the outlet opening 41 has a vertical dimension which exceeds the vertical dimension of the pipe section 25 which is to be passed therethrough as explained more fully hereinbelow.

Means is provided to inhibit the flow of the formable outer component 23 forwardly through the outlet opening 41 into the receptacle 27. In the embodiment illustrated, this means includes a flexible, resilient diaphragm 43 of plastic or rubber which is suitably attached to the bulkhead 39 and which projects into the outlet opening 41. As best shown in FIGS. 2 and 4, the diaphragm 43 is of generally U-shaped configuration in end elevation with the U-shaped configuration opening upwardly. Thus, for a cylindrical pipe section, the diaphragm inhibits the flow of the outer component 23 only with respect to the lower regions of the outlet opening 41 with the upper regions of the outlet opening and the diaphragm being spaced from such pipe section.

The inner periphery of the diaphragm 43 contains a plurality of slits defining a plurality of flexible resilient fingers 45 which project radially into the outlet opening 41. This enables the inner periphery of the diaphragm 43 to better conform to surface irregularities on the pipe section 25 being passed therethrough, which surface irregularities may result, for example, from reinforcing materials on the pipe section.

It is desirable to stabilize the receptacle 27 in the trench 13. Although this can be accomplished in different ways, in the embodiment illustrated, it is accomplished by doors 47 pivotally attached to the side walls 35, respectively. Adjacent openings in the side walls are pivotable outwardly into engagement with the sides 17 of the trench 13 as shown in FIGS. 3 and 4. Each of the doors 47 may be releasably held in the outward position shown in FIG. 3 in any suitable manner, such as by a rod 49 which may be removably affixed to the side walls 35 in any suitable manner, such as by interengaging teeth (not shown) on the rod and the opening out of which the door 47 pivots. The doors 47 form portions of the side walls 35 and they taper away from each other as they extend rearwardly so that they can compact compactible material and/or the side walls 17 of the trench as the apparatus 11 advances in the trench. Alternatively, the rod 49 could be a hydraulic actuator or other extendable means for urging the door 47 against the side wall 35 to move the apparatus 11 laterally by reacting against the side wall. Of course, elements other than the door 47 can be used to contact the side wall 35 and the number and location of the doors 47 may be selected depending upon the results desired.

Means is provided for reducing or eliminating the movement of the formable outer component 23 forwardly along the outer surfaces of the side walls 35. In the embodiment illustrated, such means includes resilient flexible members 50 (FIGS. 3 and 4) suitably attached to the side walls 35, respectively. Each of the members 50 is adapted to form a seal against the associated side 17 of the trench 13. Each of the members 50 slopes radially outwardly as it extends rearwardly so that the hydrostatic force of the formable outer component 23 acting thereagainst will tend to more tightly seal the member 50 against the associated side 17 of the trench 13.

Means for at least partially supporting one or more of the pipe sections 25 is provided on the bottom 37 of the receptacle 27. Such means includes a plate 51 mounted for axial reciprocating movement along the bottom 37 of the receptacle 27 by two spaced parallel guides 53 which are affixed to the bottom 37. The plate 51 is supported by four sets of linkages 55 each of which includes a link 57 pivotally attached by a flange 59 to the bottom 37 of the receptacle 27, a link 61 pivotally attached to the link 57 and to a connecting rod 63 of an actuator 65, such as a pneumatic or hydraulic actuator. Each of the linkages 55 also includes a roller 67 suitably rotatably rounded for rotation about the pivot axis between the links 57 and 61. To facilitate pivotal attachment of the links 57 and 61, one of them can be in the form of a yoke, if desired. The underside of the plate 51 rests on and can roll along the rollers 67. By extending or retracting the rod 63 of one of the actuators 65, the associated roller 67 is raised or lowered to thereby raise or lower the portion of the plate 51 resting on such roller. Thus, the linkages 55 form means for vertically positioning the pipe section 25 on the plate 51.

The pipe section 25 in the receptacle 27 is supported on a pair of rails 60 (FIGS. 3A and 4A) which rest on the upper surface of the plate 51. Each of the rails 60 is held against longitudinal movement in the receptacle 27 by a slide member 62 and a retainer 64 attached to the bulkhead 39 for slidably receiving the slide member. Each of the rails 60 can move vertically as permitted by the slide member 62 and the retainer 64, but is retained against axial movement relative to the bulkhead 39. The plate 51 can be slid axially beneath the rails 60 in a manner described hereinbelow. A plurality of guides 66 are attached to the plate 51 to retain the rails 60 against lateral movement relative to the plate 51. The upper surfaces of the rails 60 lie above the upper surface of the plate 51 so that the pipe section 25 in the receptacle 27 can rest on, and be supported by, the rails.

The plate 51 can be reciprocated beneath the rails 60 by a pair of actuators 68, each of which is suitably affixed to the bottom 37 and is coupled to a lug 70 (FIG. 2) of the plate 51. The slide members 62 and the retainers 64 hold the rails 60 against reciprocation with the plate 51, and accordingly, the rails 60 slide on the plate 51 during the reciprocating movement of the plate. The friction between the rails 60 and the plate 51 can be reduced in various different ways, such as by lubricating the surfaces or providing rollers between the surfaces.

The plate 51 includes a plurality of openings in which a plurality of pusher elements 69 are pivotally mounted, respectively. In the embodiment illustrated, each of the pusher elements 69 is mounted on a rod 71 which is affixed to the plate 51 with the pivotal axis for each of the pusher elements 69 being generally transverse. Each of the pusher elements 61 is unbalanced about its pivot axis and tends to pivot counterclockwise as viewed in FIG. 2 so that a shoulder 73 and a sloping cam surface 74 project above the plane of the plate 51, as shown in FIG. 2. Stops 75 or other suitable means are affixed to the plate 51 to limit the counterclockwise movement of each of the pusher elements 69. Thus, normally the pusher elements 69 are in the position shown in FIG. 2.

By reciprocating the plate 51 using the actuator 68, the shoulder 73 can move the pipe section 25 on the rails 60 through the outlet opening 41 with a ratcheting type of action. Specifically, on each rearward stroke, the shoulders 73 engage corresponding shoulders, indentations, and/or the end face of the pipe section 25 to move the pipe section through one increment of movement to the right, as viewed in FIGS. 2 and 3. On the forward or return movement of the plate 51, the pusher elements 69 are cammed to a depressed position and do not drivingly engage the pipe section 25. Accordingly, the pipe section remains in position on the rails 60 during the return stroke of the plate 51. Of course, this is merely illustrative of the devices which can be used to move the pipe section 25. If desired, two or more reciprocating devices (see FIG. 3) may be used alternately to produce a more rapid advancement of the pipe section. Also if desired, a second inner component pipe section may be placed on the rails 60 while the plate 51 is being reciprocated without interruption of the reciprocation.

The coupling between the actuator 68 and the plate 51 may include a pin and slot connection or other suitable means which allow the linkages 55 to raise and lower the plate without interference from such coupling.

The means for positioning the pipe section 25 in the receptacle 27 includes means for positioning the pipe section laterally in the receptacle. Such means includes a pair of lateral positioning members 77 and 79, each of which in the embodiment illustrated is in the form of an elongated channel adapted to extend generally axially in the receptacle 27. Each of the positioning members 77 and 79 is mounted on the adjacent side wall 35 for movement toward and away from the receptacle in a generally horizontal plane. Although the mounting means for the positioning members 77 and 79 may take many different forms, in the embodiment illustrated, such mounting means includes two or more cables 81 for suspending the associated positioning member from the adjacent side wall 35. Each of the cables 81 is suitably affixed at its lower end to the associated positioning members 77 and 79 by a lug 83 or other suitable means and at its upper end to the associated side wall 35 by another lug 85 or other suitable means.

The positioning members 77 and 79 can be moved inwardly or outwardly by inflatable bags 87, one of which is provided closely adjacent each end of the positioning members 77 and 79. The bags 87 are mounted on the adjacent side wall 35 and are also attached at their inner ends to the associated positioning members 77 and 79. Each of the bags 87 can be independently inflated and deflated by a suitable conventional pneumatic system (not shown) to thereby move the associated positioning members 77 and 79 inwardly or outwardly as may be desired. For purposes of illustration, the positioning member 79 is shown in an inward position with the associated bags 87 inflated, and the positioning member 77 is shown in an outward position with the associated bags 87 at least partially deflated. By differentially inflating the bags 87 associated with either of the positioning members 77 and 79, that positioning member can be made slightly askew; i.e. nonaxial relative to the axis of the receptacle 27. The positioning members 77 and 79 are adapted to engage the outer side surfaces of the pipe section 25 in the receptacle to laterally position such pipe section.

The hold-down mechanism 29 is mounted on the bulkhead 39 of the receptacle 27. The hold-down mechanism 29 includes a hold-down plate 89, which in the embodiment illustrated, is of generally part circular configuration which opens downwardly as best shown in FIG. 4. In the operative position, the plate 89 in the embodiment illustrated projects forwardly through the outlet opening 41 of the bulkhead 39.

The plate 89 can be supported on the bulkhead 39 in various different ways, and in the embodiment illustrated, it is supported by four links 93 which are pivotally jointed at their lower ends to the plate and at their upper ends to a supporting bracket 95 suitably affixed to the bulkhead 39 as by a threaded fastener 96 which passes through a slot 98 in the bulkhead 39 to permit adjusting the position of the hold-down mechanism 29 laterally. If desired, one or more additional slots 98 may be provided in the bulkhead 39 to permit adjusting the position of the hold-down mechanism vertically. The plate 89 can be raised or lowered by a pair of hydraulic actuators 97 coupled to the brackets 95 and to the plate 89.

Specifically, the plate 89 can be raised by retracting the actuators 97. The links 93 pivot counterclockwise as viewed in FIG. 2 to pivot the plate 89 upwardly while maintaining the plate generally horizontal. By reversing this process, the plate 89 can be lowered. By inclining the actuators 97 as shown in FIG. 2, the actuator resists forces applied to the plate 89 tending to elevate the plate.

The source 31 of the outer component 23 can be placed at a variety of locations, including a location remote from the receptacle 27. The source 31 may be a single fixed source or a movable source. Alternatively, as the pipeline progresses, multiple sources of the outer component 23 can be utilized. The source may, for example, be pulled along by the receptacle 27. In the embodiment illustrated, the source 31 is shown diagrammatically, and thus may be at any of the above-mentioned locations; however, for purposes of discussion, it will be assumed that the source 31 is located out of the trench 13 at grade level.

Although the outer component 23 can be moved to the area just rearwardly of the bulkhead 39 by many different means, in the embodiment illustrated, such delivery means 33 includes a manually operable valve 101, a pump 103, and a conduit 105 extending from the source 31 through an aperture 107 in the bottom of one of the pipe sections 25. Thus, the outer component 23 is delivered to a location beneath the inner component 21 and flows upwardly at least part way around the sides of the inner component 21 as illustrated somewhat diagrammatically in FIG. 1.

In the embodiment illustrated, the outer component 23 does not completely encase the inner component 21 and the diaphragm 43 does not provide a 360° seal around the pipe section 25 being passed through the outlet opening 41. Accordingly, it is desirable to control the flow of the outer component 23 so that its elevation does not rise to the upper regions of the outlet opening 41 where it could pass between the diaphragm 43 and the pipe section 25 into the receptacle 27.

To accomplish this, a sensor 109 (FIG. 1) is mounted on the bulkhead 39. The sensor 109 is a level control which senses the level of the outer component 23 at a location immediately rearwardly of the bulkhead 39. When the outer component 23 reaches a predetermined elevation, the sensor 109 provides a signal which shuts off the pump 103. Of course, other action could be taken in response to the signal from the sensor 109 to prevent the level of the outer component 23 from rising about the maximum allowable level. As the receptacle 27 advances as described hereinbelow and the level of the outer component 23 at the sensor 109 diminishes, the sensor restarts the pump 103.

Assuming for the purposes of illustration that the apparatus 11 is to be used in the trench 13 as shown in FIG. 1, another one of the pipe sections 25 may be lowered downwardly by a crane or other suitable device into the receptacle to rest on the rails 60. Alternatively, the pipe section may be loaded into the receptacle from the front. During the time that the pipe section 25 is being loaded into the receptacle 27, the bags 87 are preferably deflated to enlarge the size of the opening into which the pipe section is to be inserted. Because the front end of the receptacle 27 is open, the pipe section 25 may have a length which significantly exceeds the length of the receptacle 27, in which event, the forward end of the pipe section will project forwardly; i.e. to the left as viewed in FIGS. 1–3 of the receptacle.

With the pipe section 25 supported on the rails 60, it is next positioned transversely in the receptacle 27 to align it with the previously installed pipe section 25, substantially all of which is rearwardly; i.e. to the right as viewed in FIGS. 1–3, of the bulkhead 39. The pipe section 25 in the receptacle 27 can be raised or lowered by appropriate independent actuation of the actuators 65, and it can be moved laterally on the rails by inflating to a proper degree one or more of the bags 87 to cause the positioning members 77 and/or 79 to move the pipe section laterally.

After the pipe section 25 in the receptacle 27 has been properly positioned, the actuators 68 are activated to reciprocate the plate 51 and the pusher elements 69. The shoulders 73 of the pusher elements 69 engage corresponding shoulders and/or the forward end of the pipe section 25 as the plate 51 is moved to the right. This movement is brought about by extending both of the actuators 68. By retracting both of the actuators 68, the plate 51 is returned to the left and, because of the sloping cam surfaces 74 on the pusher elements 69, the shoulders 73 are moved to a depressed position during the return movement of the plate 51. During the return movement of the plate 51, the plate slides beneath the rails 60 and there is no positive driving engagement between the pipe section and the plate. The plate 51 is supported during its reciprocating movement by the rollers 67. Thus, the plate 51 and the pusher element 69 serve as a ratchet mechanism for moving the pipe section 25 through the outlet opening 41.

As the pipe section nears the outlet opening 41, it ultimately abuts the lefthand end of the pipe section which was previously moved through the outlet opening 41 whereupon the pipe section 25 in the receptacle 27 becomes substantially anchored by the pipeline 19 against further movement to the right. Thereafter, the ratcheting action of the plate 51 moves the receptacle 27 to the left with the pipe section 25 remaining stationary relative to the remainder of the pipeline 19. In either event; i.e. whether the pipe section 25 in the receptacle 27 is moving to the right or whether the receptacle 27 is moving to the left, the result is the relative axial advance of the receptacle and the pipe section.

As the pipe section 25 in the receptacle 27 is moved through the outlet opening 41, two important events occur. First, the pipe section is engaged by the plate 89 of the hold-down mechanism 29. This engagement prevents the pipe section from being elevated due, for example, to any forces such as flotation which may exist as a result of the formable outer component 23 being present rearwardly of the bulkhead 39. Secondly, the curved plate 89 tends to retain the pipe section 25 against lateral shifting movement as it is moved through the outlet opening 41. The hold-down mechanism 29 is of substantially constant mass; however, the amount of downward force which it exerts on the pipe section 25 can be controlled by the actuators 97. If the pipe section 25 has a bell end, the actuators 97 can be retracted to elevate the plate 89 to accommodate the bell end of the pipe section.

When the pipe section 25 is moved through the outlet opening 41, the diaphragm 43 substantially completely seals the lower portion of the pipe section against flow of the outer component 23 forwardly through the outlet opening 41 into the receptacle 27. The individual fingers 49 can separately bend and flex to accommodate irregularities in the outer periphery of the pipe section. If the pipe section 25 were to be completely encased by the outer component 23, the diaphragm 43 could be made to extend completely around the pipe section passing through the opening 41 so as to seal completely around the pipe section.

During the time that the pipe section 25 and the receptacle 27 are being relatively advanced, the pump 103 is operating to pump the outer component 23 through the aperture 107. The sensor 109 serves as a level control as described above to prevent the level of the outer component 23 from rising above a predetermined level, such as a level which would permit the outer component to flow into the receptacle 27.

FIGS. 5 and 6 show an apparatus 11a which is identical to the apparatus 11 (FIGS. 1–4) in all respects not specifically shown or described herein. Portions of the apparatus 11a corresponding to portions of the apparatus 11 are designated by corresponding reference numerals followed by the letter "a".

The primary difference between the apparatus 11 and the apparatus 11a is that each of the side walls 35a has a rearward portion 121. These rearward portions 121 taper away from each other as they extend rearwardly toward the bulkhead 39a and they extend all the way to the bulkhead.

Another difference is that the doors 47 are eliminated, and the receptacle 27a is stabilized by a pair of skids 123 attached to the opposite sides of the forward portion of the receptacle 27 and which are adapted to be supported on the bottom 15a of the trench 13a. If desired, the skids 123 in this embodiment could be tracked or similar devices for reducing friction as the receptacle is advanced in the trench. Also, the skids 123 may be attached to at least the front or rear of the lower portion of the receptacle and may be activated toward or away from the receptacle by means such as wedges or cylinders to selectively vertically position the apparatus by raising or lowering at least front or rear portions by reaction against the bottom 15a of the trench 13a. Finally, the members 50 are eliminated.

The operation of the apparatus 11a is identical to the operation of the apparatus 11 insofar as the laying and positioning of the pipe sections are concerned. However, the apparatus 11a is provided with a different form of means responsive to the relative advance of the apparatus 11a and the pipe sections 25a for compacting compactible side walls of the trench 13a. In the embodiment shown in FIGS. 5 and 6, such means includes the tapered rearward portions 121. Prior to and/or during the forward movement of the apparatus 11; i.e. to the left as viewed in FIG. 5, compactible soil 125 is placed in front of the tapered rearward portions 121 of the side walls 35a. Accordingly, as the receptacle 27a advances to the left, the tapered rearward portions 121 act as a wedge to forcibly compact the compactible soil 125, and this materially assists in strengthening the sides 17a of the trench 13a.

Although an exemplary embodiment of the invention has been shown and described, many changes, modifications and substitutions may be made by one having ordinary skill in the art without necessarily departing from the spirit and scope of this invention.

I claim:

1. An apparatus for forming underground pipelines of the type which include, at least during construction of the pipeline, a plurality of inner component sections at least partially enclosed by a formable outer component, said apparatus comprising:

a receptacle including means for supporting at least a portion of one of said inner component sections, said receptacle having an inlet opening sized to receive at least said one inner component section whereby at least said one inner component section can be inserted through said inlet opening and supported at least partially in said receptacle by said supporting means;

said receptacle including a bulkhead extending generally transversely adjacent one end of the receptacle, said bulkhead having an outlet opening of sufficient size to permit said one inner component section to pass rearwardly from the receptacle through the outlet opening;

means on said receptacle for at least assisting in relatively axially advancing said receptacle and said inner component section whereby said one inner component section can be moved rearwardly relative to said receptacle and be closely adjacent an inner component section which was previously received by said receptacle and whereby said one inner component section can be moved rearwardly relative to said receptacle through the outlet opening to make room in the receptacle for at least another of the inner component sections;

a source of the formable outer component operatively associated with but not supported by said receptacle so that the location of said source is independent of said receptacle;

means operatively associated with said doors for delivering the formable outer component from said source firstly to a location beneath the upper regions of the inner component section adjacent and rearwardly of said bulkhead whereby the outer component can be formed at least partially around regions of the inner component sections which are rearwardly of said bulkhead; and means associated with said bulkhead for inhibiting the flow of the formable outer component forwardly through said outlet opening of the bulkhead.

2. An apparatus as defined in claim 1 including adjustable hold-down means of constant mass coupled to the receptacle for restraining said one inner component section at least rearwardly of said bulkhead against transverse movement in at least one direction beyond a predetermined position, said adjustable hold-down means including means for adjusting the position thereof relative to said bulkhead.

3. An apparatus as defined in claim 1 including adjustable positioning means on said receptacle for raising and lowering at least a portion of said one inner component section when the latter is in said receptacle.

4. An apparatus as defined in claim 1 wherein said means associated with said bulkhead includes first means defining at least a portion of the periphery of said outlet opening with at least a portion of said first means being resilient whereby an inner component section having a varying periphery can pass through said outlet opening.

5. An apparatus as defined in claim 4 wherein said first means includes a resilient diaphragm having a plurality of adjacent resilient flexible fingers defining at least a region of said portion of the periphery of said outlet opening.

6. An apparatus as defined in claim 1 wherein said source is remote from said bulkhead.

7. An apparatus as defined in claim 1 wherein said delivering means delivers the formable outer component firstly to a location beneath the inner component section adjacent the bulkhead.

8. An apparatus as defined in claim 1 wherein said receptacle includes first and second generally opposed side walls, each of said side walls having a door pivotally attached thereto, said doors tapering away from each other as they extend rearwardly, and means operatively associated with said doors for pivoting the doors outwardly of their respective side walls whereby when the apparatus is placed in a trench the doors can be urged against the sides of the trench to compact the compactible material of the sides of the trench.

9. An apparatus as defined in claim 1 including first and second members extending outwardly from the sides of said receptacle, respectively, to reduce the movement of the formable outer component forward of said first and second members.

10. An apparatus as defined in claim 1 wherein said one inner component section has an aperture therein and said delivering means delivers the formable outer component through said aperture to said location.

11. An apparatus as defined in claim 1 wherein said advancing means includes at least first and second advancing means operable alternately to relatively axially advance the receptacle and the inner component section.

12. An apparatus as defined in claim 1 including sensing means operatively associated with said receptacle responsive to the elevation of the formable outer component adjacent said inhibiting means for providing an indication when the elevation of the formable outer component rises above a predetermined elevation.

13. An apparatus as defined in claim 1 wherein said inhibiting means inhibits the flow of the formable outer component forwardly through the lower regions of said outlet opening only with the upper regions of the outlet opening being spaced from said one inner component section.

14. An apparatus as defined in claim 13 wherein said inhibiting means includes a resilient flexible diaphragm of generally U-shaped configuration carried by said bulkhead and opening upwardly.

15. An apparatus for forming underground pipelines of the type which include a formable outer component at least partially enclosing a plurality of inner component sections at least during construction of the pipeline, said apparatus comprising:

- a receptacle including means for supporting at least a portion of one of said inner component sections, said receptacle having an inlet opening sized to receive at least said one of the inner component sections whereby at least said one inner component section can be inserted through said inlet opening and at least partially supported in said receptacle by said supporting means;
- said receptacle including a bulkhead extending generally transversely adjacent one end of the receptacle, said bulkhead having an outlet opening of sufficient size to permit said one inner component section to pass rearwardly from the receptacle through the outlet opening;
- said receptacle and said inner component section being relatively axially advanceable whereby said one inner component section can be moved rearwardly relative to said receptacle and be closely adjacent an inner component section which was previously received by said receptacle and whereby said one inner component section can be moved rearwardly relative to said receptacle through the outlet opening to make room in the receptacle for at least another of the inner component sections;
- means operatively associated with said receptacle for delivering the formable outer component to a location rearwardly of said bulkhead whereby the outer component is formed at least partially around at least portions of the inner component sections which are rearwardly of said bulkhead;
- means associated with said bulkhead for inhibiting the flow of the formable outer component forwardly through said outlet opening of the bulkhead;
- hold-down means of substantially constant mass coupled to the receptacle for restraining said one inner component section against movement in at least one transverse direction beyond a predetermined position; and
- at least one means in said receptacle adapted to underlie at least said one inner component section when the latter is supported in said receptacle by said supporting means for relatively advancing the receptacle and said one inner component section.

16. An apparatus as defined in claim 15 wherein said hold-down means is mounted on said bulkhead and at least a portion of said hold-down means is rearward of said bulkhead, and said delivering means delivers the formable outer component to said location without passing the formable outer component through the hold-down means.

17. An apparatus as defined in claim 15 including means on the receptacle for applying a positioning force to said one inner component section to at least partially position said one inner component section in said receptacle.

18. An apparatus as defined in claim 15 wherein said hold-down means is independent of said delivering means.

19. An apparatus as defined in claim 15 wherein said inhibiting means inhibits the flow of the formable outer component forwardly through the lower regions of the outlet opening only with the upper regions of the outlet opening being spaced from said one inner component section.

* * * * *